United States Patent [19]
Wu et al.

[11] Patent Number: 5,646,974
[45] Date of Patent: Jul. 8, 1997

[54] HIGH SPEED APPARATUS FOR BRANCH DETECTION OF A LOOP INSTRUCTION

[75] Inventors: Wen-Yi Wu, Hsinchu Hsien; Ya Nan Mou, Taipei, both of Taiwan

[73] Assignee: United Microelectronics Corporation, Hsinchu, Taiwan

[21] Appl. No.: 597,386

[22] Filed: Feb. 8, 1996

[51] Int. Cl.$^6$ ................................................. G07C 3/00
[52] U.S. Cl. ............................................................... 377/15
[58] Field of Search .......................................... 377/16, 15

[56] References Cited

U.S. PATENT DOCUMENTS

| | | | |
|---|---|---|---|
| 4,463,422 | 7/1984 | Storer et al. | 364/300 |
| 4,853,840 | 8/1989 | Shibuya | 364/200 |
| 4,910,644 | 3/1990 | Arizono | 364/200 |

Primary Examiner—Margaret Rose Wambach
Attorney, Agent, or Firm—Ladas & Parry

[57] ABSTRACT

An apparatus for branch detecting a loop operation in a microprocessor. The apparatus includes a register, an ALU port, a predetector, an ALU, a flag generator and a branch detector. The register is provided for storing a loop information. Through the ALU port, the loop information is sent to the predetector and is predetected therein whenever the loop operation is about to proceed. A predetected result is then generated by the predetected and is sent to the branch detector to determine whether the loop operation has to be terminated. The ALU processes the loop information and updates new loop the register at the same time the predetection and detection tasks are performed by the predetector and the branch detector, respectively. The flag generator generates a flag which is independent of the detection and termination of the loop operation.

6 Claims, 4 Drawing Sheets

HIGH SPEED APPARATUS FOR BRANCH DETECTION OF A LOOP INSTRUCTION

BACKGROUND OF THE INVENTION

1. Field of the Invention

The present invention relates to a microprocessor architecture, and more specifically, to a high speed apparatus for branch detection of a LOOP instruction in the microprocessor.

2. Technical Background

A LOOP instruction, which controls a specific number of repeats of actions (i.e., loop operations) in a microprocessor, is one of the most frequently used instructions. For example, a number of loop operations controlled by a LOOP instruction are essential for using an iteration method to find the solutions of equations. The iteration calculation can be carried out by repeating the modification to iterative values which are iterated into the equations. Some constraints may be applied to the iterative values or the number of loop operations to terminate the LOOP instruction. Therefore, when the LOOP instruction is applied, a subtraction operation may be performed by an arithmetic logic unit (ALU) and other related elements in the microprocessor to determine whether the LOOP instruction should be terminated.

The aforementioned operation of the LOOP instruction can be carried out in the microprocessor by the architecture illustrated in FIG. 1. Referring to FIG. 1, the architecture includes register 11, ALU port 13, ALU 15, flag generator 17 and branch detector 19. The state information of the loop operations is stored in register 11. The information includes a count-down value which initially equals the number of loop operations that the LOOP instruction has to perform. ALU 15 obtains the count-down value through ALU port 13, subtracts the countdown value by 1, and writes an updated count-down value back to register 11 whenever each loop operation is about to proceed. At the same time, flag generator 17 uses the updated count-down value to generate a flag. Then branch detector 19 acquires the flag to detect if it is a zero-flag which means to terminate the LOOP instruction.

With the rapid progress being made in VLSI technology, the clock rates microprocessors have increased to about several tens or even hundreds of MHz. That is, elements in the microprocessor are driven by the clock whose period is shorter than 100 nS. Therefore, the structure shown in FIG. 1 can hardly finish the zero-flag detection of each loop operation in such a short clock period. Obviously, if the zero-flag detection cannot be finished in time, an erroneous loop operation may go on even though the LOOP instruction should be terminated.

In order to overcome this problem, more than one clock period is typically required to perform the zero-flag detection, and each loop operation must be delayed. For example, referring to FIG. 2, flag register 18 can be introduced into the structure of FIG. 1. Flag register 18 is connected between flag generator 17 and branch detector 19 for temporarily recording the flag generated by flag generator 17 in a first time period. The flag recorded in flag register 18 can be accessed and detected by branch detector 19 in a second time period. The first and second time period may each consist of one or more clock periods. Since a longer execution time is required to determine whether the next loop operation can proceed, the operation efficiency of the microprocessor is affected when the LOOP instruction is executed therein. Moreover, since the loop operation state can be determined only when a new count-down value was generated by ALU 15, the time delay problem becomes increasingly serious as the operating speed of a high speed microprocessor increases. Therefore, a more efficient architecture to detect the loop operation state in accordance with the LOOP instruction is needed.

SUMMARY OF THE INVENTION

Accordingly, the present invention provides an apparatus for rapidly detecting the loop operation state of a LOOP instruction by skipping the time required for modifying the loop information.

The present invention also provides an apparatus for detecting the loop operation state of a LOOP instruction by ignoring the time required for generating a flag.

In the present invention, a flag-free architecture for detecting the loop operation state is utilized. The apparatus for detecting the loop operation of the present invention includes a register, an ALU port, a predetector, an ALU, a flag generator and a branch detector. The register is provided for storing a loop count value. Through the ALU port, the loop count value is sent to the predetector and is predetected therein whenever the loop operation begins. A predetected result is then sent to the branch detector to determine whether the loop operation has to be terminated. The ALU processes the loop count value and updates a new loop count value into the register at the same time the predetection and detection tasks are performed by the predetector and the branch detector, respectively. The flag generator generates a useless flag signal for the loop instruction. In other words, the flag signal generated by the loop instruction is independent of the detection and termination of the loop operation, although the termination of the loop operation may depend on the latched flag generated by the instruction prior to the loop instruction. That is, the detection of the loop operation state is flag-free. Since the generation time of the flag signal can be ignored in detection of the loop operation state, the execution rate of the LOOP instruction can be increased, thus improving the performance of the microprocessor.

Other objects, features, and advantages of the present invention will become apparent from the following detailed description of the preferred but non-limiting embodiment.

BRIEF DESCRIPTION OF THE DRAWINGS

The detailed description is made with reference to the accompanying drawings in which.

DESCRIPTION OF THE PREFERRED EMBODIMENT

Figure 1:
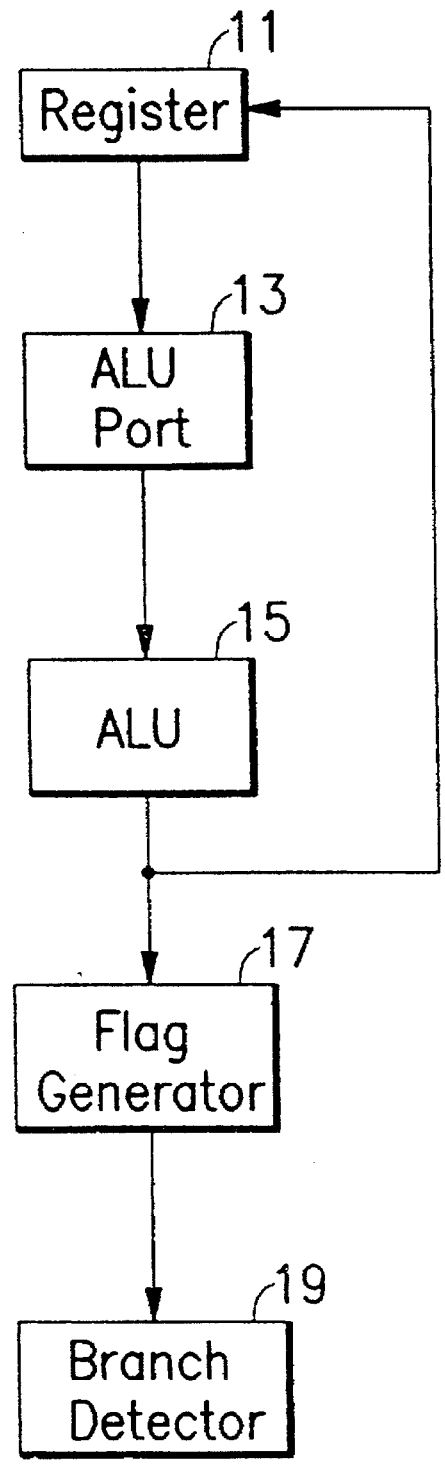
FIG. 1 illustrates a prior art architecture for detecting a loop operation in the microprocessor.
Figure 2:
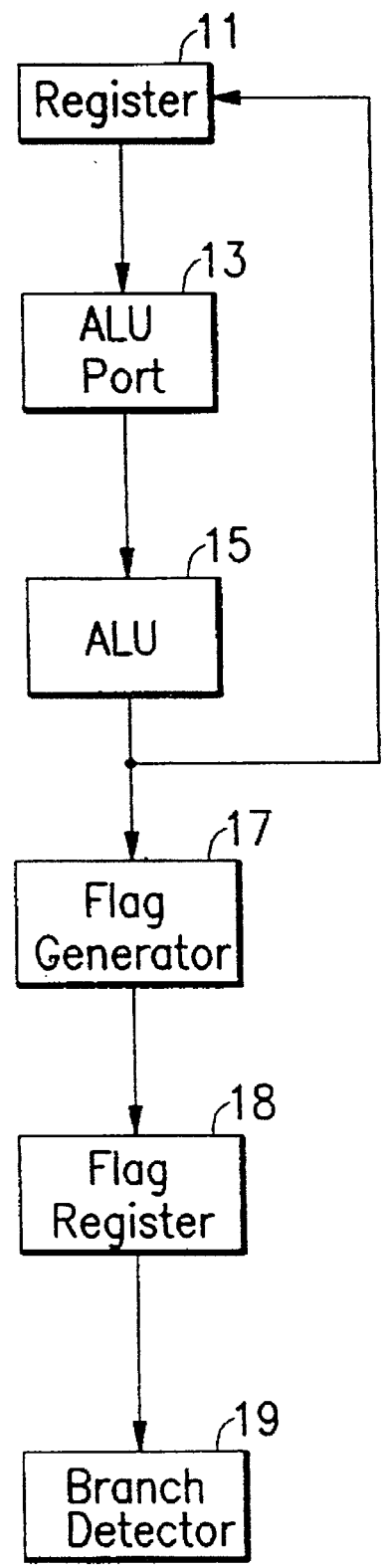
FIG. 2 illustrates another prior art architecture for detecting a loop operation in the microprocessor.
Figure 3:
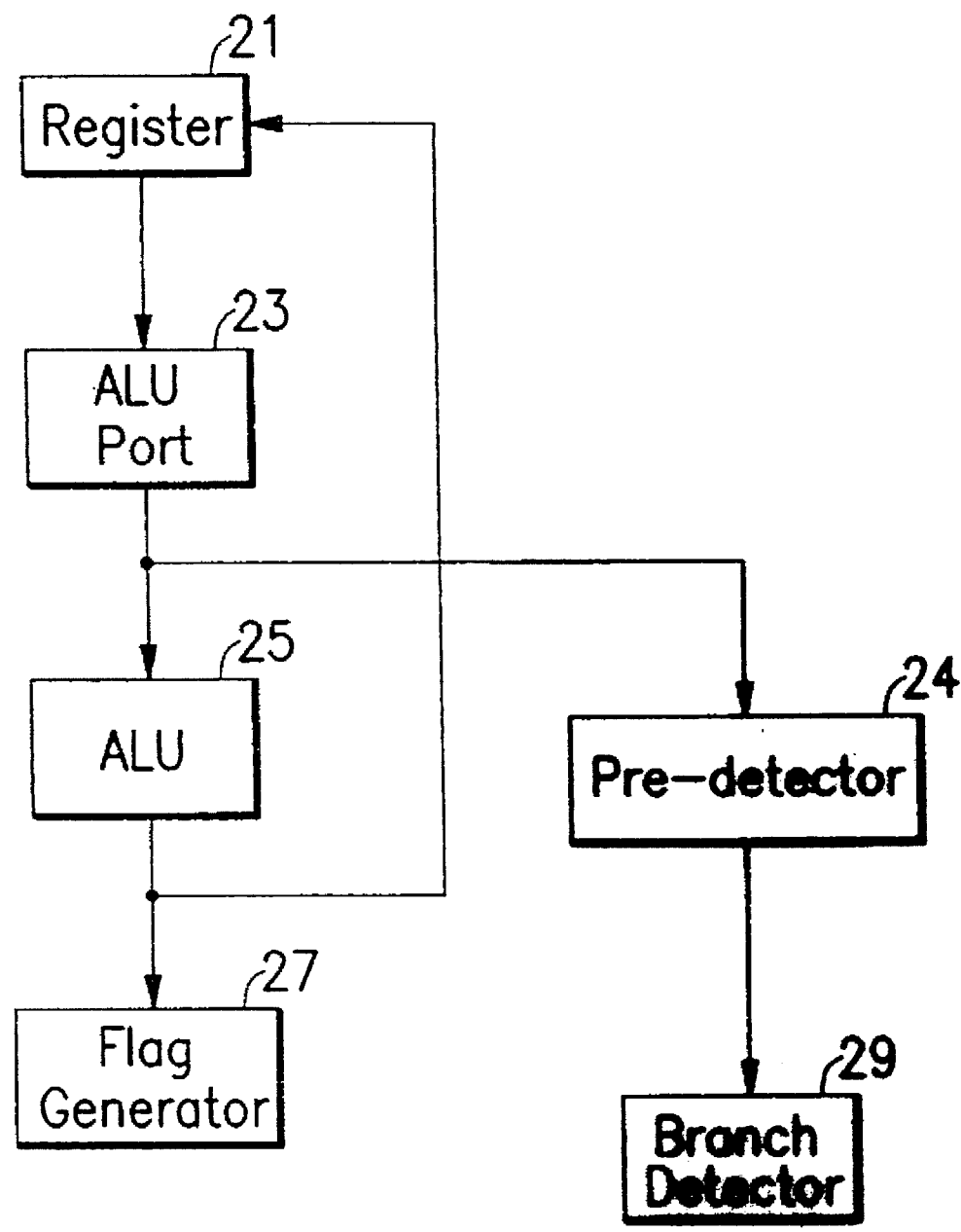
FIG. 3 illustrates the apparatus for detecting a loop operation according to the preferred embodiment of the invention.

In order to minimize the time required for detecting the loop operation, a flag-free detection method is utilized in the present invention. That is, the detection and termination of the LOOP instruction are carried out by the microprocessor architecture of the present invention in ignorance of the flag which requires a long time to generate. FIG. 3 illustrates the apparatus for branch detection of a loop operation according to the preferred embodiment of the invention. Referring to FIG. 3, the apparatus includes register 21, ALU port 23, predetector 24, ALU 25, flag generator 27 and branch detector 29.

Register 21 is provided for storing information of for example, a loop count value. The each loop operation, loop count value can be a count-down value which initially of loop operations that the LOOP equals the number instruction has to perform. In the present invention, the modification of the loop information and the detection of the loop operation state are carried out at the same time. Therefore, whenever a loop operation is about to proceed, the loop count value which is a count-down value must be sent to predetector 24 for predetecting before being subtracted by 1 in ALU 25. Predetector 24, which can be a comparator, generates a predetected result in accordance with the loop count value. The predetected result is then sent to branch detector 29 to determine whether the loop operation has to be terminated.

The loop operation state is detected by the aforementioned elements. However, other tasks, such as the flag generation, have to be done in the same architecture for completing the LOOP instruction. Referring to FIG. 3, ALU 25 receives the loop information from ALU port 23 at the same time predetector 24 receives the loop count value. The loop information, including the count value, is updated to be a new loop information and then placed into register 21. The new loop information can be accessed by ALU port 23 when a next loop operation is about to proceed. On the other hand, flag generator 27 generates a flag according to the new loop information from ALU 25. Nevertheless, the flag is independent of the detection and termination of the loop operation. That is, the time used for detecting the loop operation state will not be affected by the time required to generate the flag. Therefore, the detection rate of the loop operation state can be increased.

The conventional branch detection of the LOOP instruction terminates the loop operation when the zero-flag is generated by the flag generator. That is, a zero count-down value has to be generated in the ALU and then be sent to the flag generator. However, the apparatus of the present invention utilizes the original loop count value directly from the ALU port. Therefore, the loop operation must be terminated when the loop count value equals 1, if the loop count value is a count-down value. In other words, predetector 24 can be a comparator which compares the loop count value by 1, and whose output enables branch detector 29 to terminate the loop operation when the loop count value equals 1.

Figure 4:
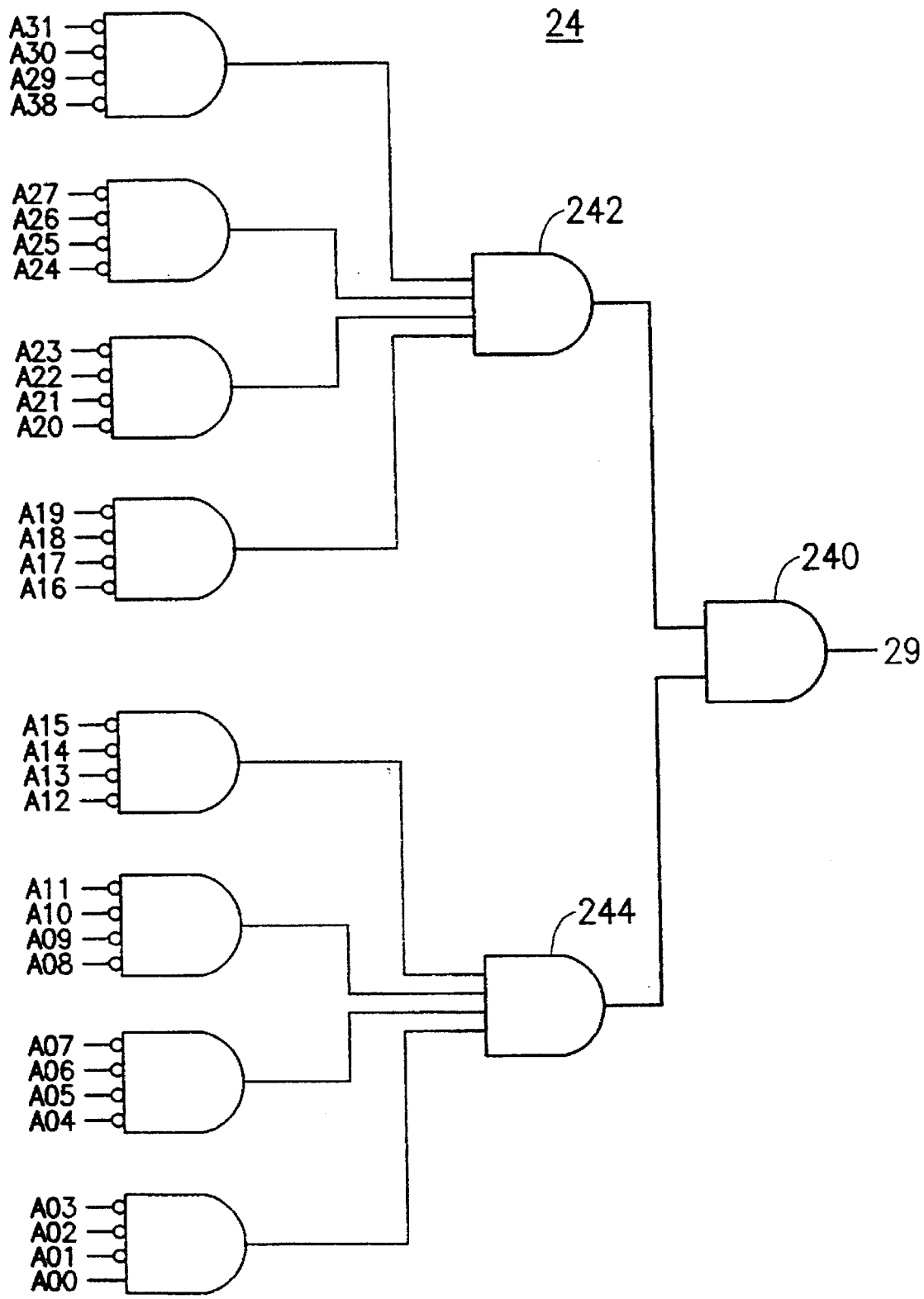
FIG. 4 is a circuit diagram illustrating the predetector in the apparatus of FIG. 3.

For example, referring to FIG. 4, a preferred circuit configuration of predetector 24 is illustrated. The predetector circuit, which is provided for detecting a 32-bit loop count value, is composed of an AND-gate array. The AND-gate array consists of eight four-port AND-logic gates whose outputs are collected by a number of AND-logic gates 240, 242 and 244, thus generating an AND-logic result of thirty-two inputs A00–A31. Since the 32-bit loop count value is compared with 1 in the predetector circuit, except for input port A00, all other input ports A01 through A31 invert their input data at first. Therefore, only when the first bit of the loop count value is 1 and all other bits are 0, the AND-gate array produces an output of 1 to branch detector 29, otherwise the output is 0. That is, the output, which either enables or disables branch detector 29 to terminate the LOOP instruction, is 1 when the loop count value is 1.

In order not to increase the circuit complexity and geometric dimension of the microprocessor, the predetector circuit utilizes only a number of logic gates which are easily implemented in a very large scale integrated (VLSI) circuits and occupy little space. Moreover, since the time required for modifying the loop information and generating the flag can be ignored in detection of the loop operation state, the execution rate of the LOOP instruction can be increased, thus improving the performance of the microprocessor.

What is claimed is:

1. An apparatus for branch detection of a loop instruction, comprising a register for storing a loop count value;

an ALU port connecting said register;

a predetector for predetecting said loop count value from said register through said ALU port;

an ALU for modifying said loop count value and updating a new loop count value into said register; and a branch detector for detecting said loop count value to determine whether said loop operation has to be terminated.

2. The apparatus for branch detection of a loop instruction of claim 1, wherein said predetector is a comparator.

3. The apparatus for branch detection of a loop instruction of claim 1, wherein said loop count value is a count-down value whose initial value equals the number of loop operations that the loop instruction has to perform; and said predetector compares the loop count value with 1.

4. The apparatus for branch detection of a loop instruction of claim 3, wherein said predetector includes an AND-logic array.

5. The apparatus for branch detection of a loop instruction of claim 3, wherein an output value of said predetector is 1 when the loop count value is 1, otherwise the output value is 0.

6. The apparatus for branch detection of a loop instruction of claim 1, wherein said ALU and said predetector process said loop count value at the same time.

* * * * *